United States Patent
Alba Fernandez et al.

(10) Patent No.: US 10,867,592 B2
(45) Date of Patent: Dec. 15, 2020

(54) CURTAIN PROVIDING A BARRIER AGAINST LIGHT, NOISE, HEAT, FIRE AND ELECTROMAGNETIC RADIATION

(71) Applicant: UNIVERSITAT POLITECNICA DE VALENCIA, Valencia (ES)

(72) Inventors: Jesús Alba Fernandez, Valencia (ES); Romina María Del Rey Tormos, Valencia (ES); Vicente Jorge Sanchís Rico, Valencia (ES)

(73) Assignee: UNIVERSITAT POLITECNICA DE VALENCIA, Valencia (ES)

( * ) Notice: Subject to any disclaimer, the term of this patent is extended or adjusted under 35 U.S.C. 154(b) by 258 days.

(21) Appl. No.: 15/738,374

(22) PCT Filed: Jun. 22, 2016

(86) PCT No.: PCT/ES2016/070469
§ 371 (c)(1),
(2) Date: Dec. 20, 2017

(87) PCT Pub. No.: WO2017/005948
PCT Pub. Date: Jan. 12, 2017

(65) Prior Publication Data
US 2018/0182368 A1 Jun. 28, 2018

(30) Foreign Application Priority Data
Jul. 3, 2015 (ES) .................................. 201530961

(51) Int. Cl.
*G10K 11/168* (2006.01)
*A62C 2/10* (2006.01)
(Continued)

(52) U.S. Cl.
CPC ........... *G10K 11/168* (2013.01); *A47H 23/08* (2013.01); *A62C 2/10* (2013.01); *B32B 5/022* (2013.01);
(Continued)

(58) Field of Classification Search
CPC ..... E04B 1/88; E04B 1/92; E04B 1/94; E04B 1/99; E04B 2001/925; H05K 9/00;
(Continued)

(56) References Cited

U.S. PATENT DOCUMENTS

| 4,391,865 A | 7/1983 | Constance |
| 5,097,885 A * | 3/1992 | Kitagawa ................. E06B 5/18 |
| | | 160/238 |

(Continued)

FOREIGN PATENT DOCUMENTS

| EP | 2384792 A1 | 11/2011 |
| ES | 1119330 U | 8/2014 |

(Continued)

OTHER PUBLICATIONS

Del Rey, R et al., "New Absorbent Acoustic Materials from Plastic Bottle Remnants," Materiales de Construccion, vol. 61, 304, pp. 547-558, 2011 (translation included).

*Primary Examiner* — Edgardo San Martin
(74) *Attorney, Agent, or Firm* — Wiggin and Dana LLP; Gregory S. Rosenblatt; Jonathan D. Hall (57) ABSTRACT

The invention relates to a curtain providing a barrier against light, noise, heat, fire and electromagnetic radiations. The curtain comprises two textile layers, each having a combination of non-woven textile material and woven textile material, subjected to a fire-proofing treatment; an inner layer sandwiched between the textile layers and formed by sound insulation wool; and a cover layer adjacent to the outer side of one of the textile layers, formed by a metal (Continued)

selected from the group consisting of aluminum and copper. The curtain as a whole has a total thickness between 0.5 cm and 3 cm.

17 Claims, 10 Drawing Sheets

(51) Int. Cl.
| | |
|---|---|
| *B32B 5/26* | (2006.01) |
| *E04B 1/88* | (2006.01) |
| *A47H 23/08* | (2006.01) |
| *B32B 5/02* | (2006.01) |
| *B32B 17/06* | (2006.01) |
| *E04B 1/94* | (2006.01) |
| *A61G 10/00* | (2006.01) |

(52) U.S. Cl.
CPC .............. *B32B 5/024* (2013.01); *B32B 5/028* (2013.01); *B32B 5/26* (2013.01); *B32B 17/064* (2013.01); *E04B 1/88* (2013.01); *A61G 10/005* (2013.01); *B32B 2262/0276* (2013.01); *B32B 2262/101* (2013.01); *B32B 2307/102* (2013.01); *B32B 2307/3065* (2013.01); *B32B 2307/72* (2013.01); *B32B 2307/73* (2013.01)

(58) Field of Classification Search
CPC ...... H05K 9/0003; H05K 9/0005; B32B 5/26; B32B 5/24; B32B 5/22; B32B 5/022; B32B 5/024; G10K 11/168; G10K 11/162; G10K 11/16; A47H 23/08; A47H 23/02; A47H 21/00; A62C 2/10
See application file for complete search history.

(56) References Cited

U.S. PATENT DOCUMENTS

| | | | | |
|---|---|---|---|---|
| 5,741,582 A | * | 4/1998 | Leaderman | B32B 5/26 428/317.5 |
| 7,882,849 B2 | * | 2/2011 | Franta | E04H 15/001 135/115 |
| 7,948,424 B2 | * | 5/2011 | Kudo | H05K 9/009 342/1 |
| 8,191,678 B2 | * | 6/2012 | Zou | H04R 1/342 181/284 |
| 8,839,842 B2 | * | 9/2014 | Ashelin | E06B 9/13 160/330 |
| 9,475,260 B2 | * | 10/2016 | Brunswick | B32B 5/26 |
| 10,145,139 B2 | * | 12/2018 | Tufto | E04H 15/001 |
| 2002/0148626 A1 | | 10/2002 | Matsumura et al. | |
| 2008/0001128 A1 | | 1/2008 | Goldberg | |
| 2009/0311934 A1 | | 12/2009 | Carpanedo et al. | |
| 2011/0100747 A1 | | 5/2011 | Hoetzeldt et al. | |
| 2013/0189471 A1 | | 7/2013 | Ashelin et al. | |
| 2014/0034415 A1 | | 2/2014 | Brunswick | |
| 2016/0361894 A1 | * | 12/2016 | Ciuperca | B32B 5/028 |

FOREIGN PATENT DOCUMENTS

| | | |
|---|---|---|
| FR | 2508969 A1 | 1/1983 |
| FR | 2845754 A1 | 4/2004 |
| FR | 2990222 A1 | 11/2013 |
| GB | 2311008 A | 9/1997 |
| GB | 2395461 A | 5/2014 |
| JP | 08199703 A | 8/1996 |
| JP | 11181911 A | 7/1999 |
| JP | 2001073266 | 3/2001 |
| JP | 2010067744 A | 3/2010 |
| WO | 90/15181 A1 | 12/1990 |

\* cited by examiner

FIG. 8 ately installed inside a construction structure. This panel does now allow for the quick and simple transport, assembly and disassembly thereof in a desired location for temporarily blocking said radiations.

CURTAIN PROVIDING A BARRIER AGAINST LIGHT, NOISE, HEAT, FIRE AND ELECTROMAGNETIC RADIATION

FIELD OF THE INVENTION

The present invention relates to the field of protection against radiations and the like, and more specifically protection against electromagnetic radiations, light, heat, sound and fire. More specifically, the invention relates to a curtain having all the aforementioned types of protection.

BACKGROUND OF THE INVENTION

Protection against different types of radiations and the like is required in different technical fields, such as for blocking mobile phone signals in hospitals and control centers, reducing external noises in outdoor performances, blocking electromagnetic signals in means of transport such as airplanes, etc.

For example, patent document ES 1119330 discloses a solid panel with heatproof, soundproof, flameproof and electromagnetic-proof properties. This panel is intended for being incorporated inside a wall or the like for its application in construction, for example. Although this panel provides a suitable solution to different types of radiations, it must, however, be permanently installed inside a construction structure. This panel does now allow for the quick and simple transport, assembly and disassembly thereof in a desired location for temporarily blocking said radiations.

Patent document US20140034415 discloses a sound insulation material, such as a curtain. Although this material is easy to transport and install, the acoustic protection it provides is insufficient. Furthermore, it does not provide another type of protections, such as protection against electromagnetic radiation and fire, for example.

Therefore, in view of the prior art there is still a need for an insulation material having a smaller weight, such that it can be easily transported, installed and uninstalled, such as a curtain, for example. Furthermore, it would be desirable for said insulation material to provide protection against different types of radiations and the like, such as protection against light, noise, heat, fire and electromagnetic radiations. Furthermore, it would also be desirable for the insulation provided by said material, for example sound insulation, to be greater than that obtained with the materials of the prior art.

SUMMARY OF THE INVENTION

In order to achieve the aforementioned objectives, the present invention discloses a curtain providing a barrier against light, noise, heat, fire and electromagnetic radiations. The curtain of the present invention comprises:
- two textile layers each having a combination of non-woven textile material and woven textile material, subjected to at least a fire-proofing treatment;
- an inner layer sandwiched between the textile layers, formed by sound insulation wool; and
- a cover layer adjacent to the outer side of one of the textile layers, formed by a metal selected from the group consisting of aluminum and copper.

The curtain of the present invention furthermore has a total thickness of only between 0.5 cm and 3 cm, such that it is easy to handle, transport, install and uninstall in a given location.

As a result of its features as a barrier due to its composition, and as a result of its reduced thickness, the curtain of the present invention is applicable in a wide variety of fields.

For example, the curtain of the present invention can be used in generic applications for cancelling out mobile phone signals, reducing noise, increasing energy efficiency, maintaining the fire resistance and opacity of the site in which they are installed, etc.

The present invention can also be applied in medicine, as it can provide a physical separation between hospital beds, reduce different types of interferences in areas of operating rooms, etc. The present invention can also be applied in nurseries for newborns, in which the best acoustic and thermal conditions for newborns can be assured, particularly in very noisy NICU environments, and providing electromagnetic protection with respect to the environment.

The present invention can also be applied in rooms in general, conditioning one room at a given time (for example for meetings and conferences) and at the same time preventing noise from mobile phones and other systems. Since it is movable, it can be deployed or folded up, when required, and can act as an element for separating different environments without having to perform any construction work.

Another field of application of the curtain according to the present invention may be the scientific field, since it allows converting any room into an anechoic electromagnetic chamber. Tent-type portable electromagnetic chambers or the like can be generated.

Furthermore, the present invention may be applicable in outdoor performances, reducing background noise and interferences in different types of events.

Finally, the present curtain can also be applied in means of transport as a movable element to perform separation, to reduce a mobile phone signal, etc.

BRIEF DESCRIPTION OF THE DRAWINGS

The present invention will be better understood in reference to the following drawings illustrating preferred embodiments of the invention which are provided by way of example and must not be interpreted as limiting the invention in any way.

DETAILED DESCRIPTION OF THE PREFERRED EMBODIMENTS

Figure 1:
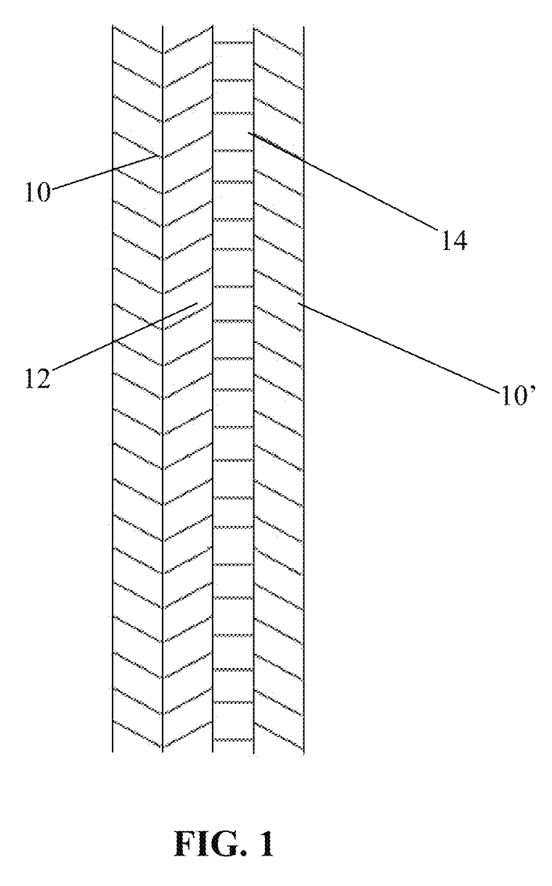
FIG. 1 is a schematic illustration of the structure of the curtain according to the preferred embodiment of the present invention.

The composition of a protective curtain according to the preferred embodiment of the present invention is first described in reference to the attached FIG. 1. In this case, the curtain comprises two textile layers (10, 10'), an inner layer (12) and a cover layer (14) adjacent to the outer side of one of the textile layers (10').

Each of the textile layers (10, 10') has a combination of non-woven textile material and woven textile material. The non-woven textile material is of the known type, such as felt, the thickness of which is preferably 3 mm to 20 mm and the density of which is preferably kg/m$^3$ to 40 kg/m$^3$. The woven textile material preferably has a density of 100 g/m$^2$ to 300 g/m$^2$.

The materials of the textile layers (10, 10') can be made of natural fibers, synthetic fibers and combinations thereof, selected from the group consisting of cotton, linen, polypropylene, polyester, jute, polyamide, rayon, nylon, PVC, etc.

Furthermore, the woven textile material of the textile layers (10, 10') is subjected to at least a fire-proofing treatment. Said treatment is performed by means of covering the layers with a kind of acrylic resin. The specific covering material depends on the fiber used in making the textile layers (10, 10'), and can be polyvinyl chloride if polyethylene terephthalate fibers are used for making the textile layers, for example. It can also be selected from any one of the group consisting of tetrakis(hydroxymethyl)phosphonium salt (preferably insoluble with ammonia gas) for cotton, diammonium phosphate/ammonium sulfate/boron compound, or hexapropoxyphosphazene for rayon, oligomeric phosphate for polyester, thiourea/titanium and zirconium compound/dibromoterephthalic acid for nylon, etc.

Furthermore, according to the preferred embodiment of the present invention, the textile layers (10, 10') are also subjected to a water-proofing treatment and an oil-proofing treatment (the person skilled in the art will understand that depending on the desired application, said layers may be subjected to other treatments known in the art).

The water-proofing treatment is based on paraffin emulsions with aluminum salts which are applied by means of plasma surface treatment or padding. Another type of water-proofing treatment can also be performed, for example, by means of silicones and the like, or by means of any other method known by the persons skilled in the art. The application of the oil-proofing treatment is widely known in the art and is described, for example, in patent document ES 2 266 172 T3.

The inner layer (12) is formed by sound insulation wool with a thickness between 3 mm and 1 cm and a density between 10 kg/m$^3$ and 50 kg/m$^3$. Said sound insulation wool can be of different types, such as polyester wool, for example. According to other embodiments of the present invention, it can also be of other wools similar to polyester wool and comprising at least 80% of a compound selected from the group comprising PP, PES and PET.

The cover layer (14) provides the property as a barrier against electromagnetic radiations and is formed by a metal selected from the group consisting of aluminum and copper and has a thickness between 0.5 mm and 5 mm. If the thickness of the cover layer (14) were less than 0.5 mm, there would be a risk of the layer breaking, which would negatively affect the acoustic, thermal and electromagnetic insulation of the final curtain. On the other hand, a thickness of this cover layer (14) greater than 5 mm would substantially increase the final weight of the curtain, making the handling and transport thereof excessively complicated.

According to the preferred embodiment of the present invention, the cover layer (14) furthermore has a glass fiber mesh reinforcement. According to other embodiments, the cover layer (14) has, for example, a special coat such as an LDPE coat and the like.

Although not shown in the attached FIG. 1, the person skilled in the art will understand that additional embodiments of the curtain of the present invention can include additional layers that are different from or identical to the layers described above. For example, according to an additional embodiment of the present invention, the curtain comprises a second inner sound insulation layer, identical to the inner layer (12) described above, sandwiched between the textile layer (10') and the cover layer (14) adjacent thereto. In other words, the final structure of the curtain according to this embodiment will be textile layer+inner layer+textile layer+second inner layer+cover layer.

According to the preferred embodiment of the present invention, the curtain has a total thickness of all the layers combined comprised between 0.5 cm and 3 cm, more preferably the curtain has a total thickness of 1 cm. If the curtain were to have a thickness less than 0.5 cm, it would not be viable since the amount of materials would not be sufficient. In contrast, if the total thickness of the curtain were greater than 3 cm, it would be too heavy and hard to handle.

Furthermore, the total weight of the curtain according to the preferred embodiment of the present invention is preferably 1 kg/m$^2$.

Therefore, the curtain according to the preferred embodiment of the present invention is lightweight, and therefore easy to transport and install/uninstall, thereby allowing its application in a number of situations in which multiple temporary protection (at least against light, noise, heat, fire and electromagnetic radiations) is required by means of quickly and simply installing the curtain, as well as subsequently uninstalling it in a similarly quick and simple manner.

A series of tests performed for verifying the protective properties offered by the curtain described above according to the preferred embodiment of the present invention will be described herein below. Specifically, the curtain subjected to the following tests has the following composition:

Material of the textile layers: 200 g/m$^2$ 100% creased polyester.

Material of the inner layer: Polyester wool with a grammage of 250 g/m$^2$ and a thickness of 8 mm.

Material of the cover layer: 1 mm inner aluminum sheet.

The complete curtain had a thickness of 1 cm.

Protection Against Light

The opacity of the curtain can be seen with the naked eye. Nevertheless, a test was performed according to the ISO 105-B02 standard, obtaining a light fastness of 5 (on a scale of 1 to 8).

Protection Against Noise

In the case of sound insulation, it is important to take into account that simply increasing the number of layers or the thickness thereof alone does not necessarily lead to an improvement, but rather it may even reduce the final sound insulation properties of the curtain. In fact, sound insulation depends on the combination of materials and the order of the combination thereof. The acoustic properties of a material or a set of materials depends on a number of factors: mechanical properties of the materials, chemical properties, bending properties, resistance properties, etc.

Three types of tests were performed to determine protection against noise: sound absorption tests, general sound insulation tests and in situ sound insulation tests.

Sound Absorption Tests:

These tests were performed according to the UNE-EN ISO 354:2004, UNE-EN ISO 11654:1998 and ASTM C423-09a standards (such standards can be consulted for a detailed explanation of the test conditions).

Three Configurations were Used in these Tests:

Configuration 1: Two curtains according to the preferred embodiment of the present invention were used. The first curtain was placed 5 cm from the wall and the second curtain was placed 15 cm from the first curtain (i.e., 20 cm from the wall).

Configuration 2: A single curtain located 5 cm from the wall was used.

Configuration 3: A single curtain located 20 cm from the wall was used.

Figure 2A:
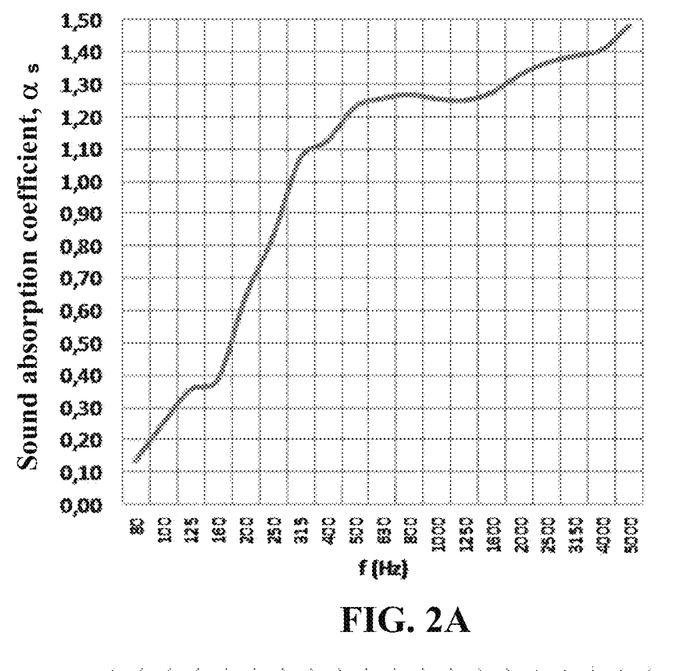
FIGS. 2A, 2B and 2C are graphs showing the sound absorption coefficient of curtains according to the preferred embodiment of the present invention in various configurations.
Figure 2B:
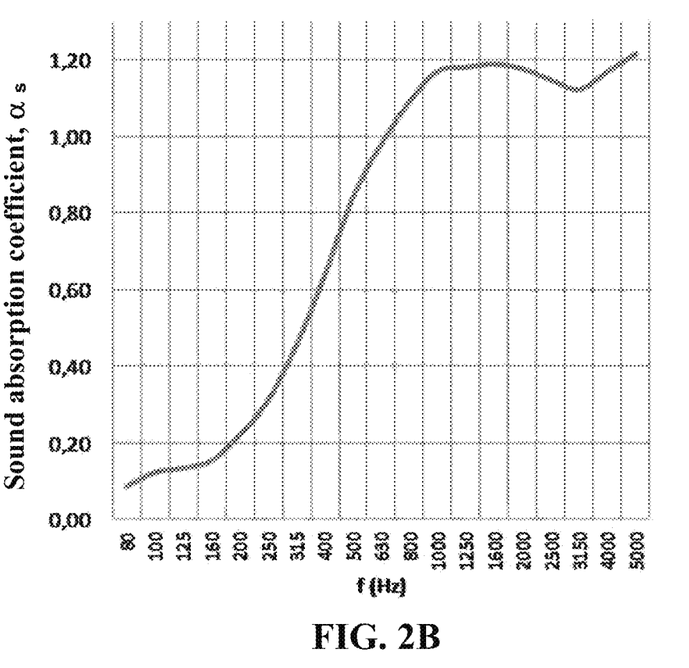
Figure 2C:
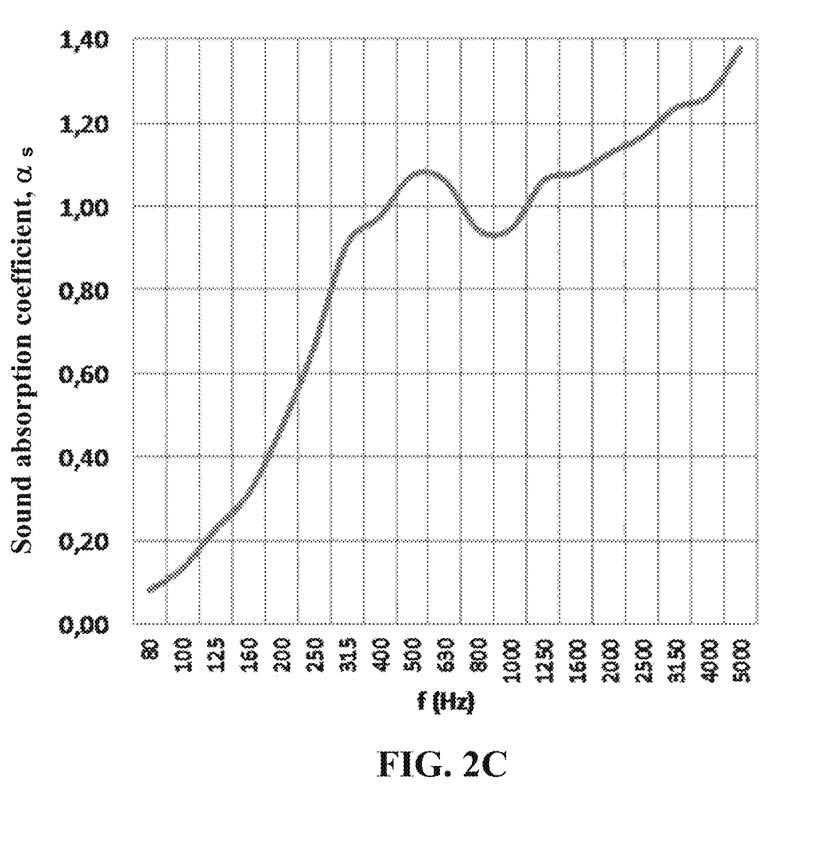

The following Table I, as well as the attached FIGS. 2A (configuration 1), 2B (configuration 2) and 2C (configuration 3) show the sound absorption coefficient obtained with the various configurations described above according to the UNE-EN ISO 354:2004 standard:

TABLE I

Sound absorption coefficient

| f (Hz) | Configuration 1 | Configuration 2 | Configuration 3 |
|---|---|---|---|
| 80 | 0.13 | 0.09 | 0.08 |
| 100 | 0.25 | 0.12 | 0.13 |
| 125 | 0.36 | 0.13 | 0.23 |
| 160 | 0.39 | 0.15 | 0.31 |
| 200 | 0.64 | 0.22 | 0.47 |
| 250 | 0.83 | 0.31 | 0.66 |
| 315 | 1.07 | 0.45 | 0.91 |
| 400 | 1.13 | 0.64 | 0.97 |
| 500 | 1.23 | 0.84 | 1.07 |
| 630 | 1.26 | 0.98 | 1.06 |
| 800 | 1.27 | 1.09 | 0.94 |
| 1000 | 1.25 | 1.17 | 0.95 |
| 1250 | 1.25 | 1.18 | 1.06 |
| 1600 | 1.27 | 1.19 | 1.08 |
| 2000 | 1.33 | 1.18 | 1.13 |
| 2500 | 1.37 | 1.15 | 1.17 |
| 3150 | 1.39 | 1.12 | 1.24 |
| 4000 | 1.41 | 1.17 | 1.26 |
| 5000 | 1.48 | 1.21 | 1.38 |

The UNE-EN ISO 11654:1998 standard establishes a method for obtaining a single parameter: $\alpha_w$ (weighted sound absorption coefficient). This parameter is used for evaluating the degree of absorption provided by a material. Depending on the value of said parameter, the standard makes a distinction between 6 classes of materials shown below in Table II:

TABLE II

Classes of sound absorption

| Class | $\alpha_w$ |
|---|---|
| A | 0.90 or greater |
| B | 0.8 to 0.85 |
| C | 0.6 to 0.75 |
| D | 0.5 to 0.55 |
| E | 0.15 to 0.25 |
| Not classified | 0.10 or less |

The results shown below in Table III were obtained according to this UNE-EN ISO 11654:1998 standard:

TABLE III

Weighted sound absorption coefficient and class

|  | Configuration 1 | Configuration 2 | Configuration 3 |
|---|---|---|---|
| $\alpha_w$ | 1.15 | 0.65 | 1.00 |
| CLASS | A | C | A |

Finally, the ASTM C423-09a standard includes two parameters that are not contemplated in the preceding standards. The first parameter is the sound absorption average (SAA), representing the mean one-third octave from 200 Hz to 2500 Hz, rounded to multiples of 0.01. The second parameter is the noise reduction coefficient (NRC), defined as the mean value of the absorption coefficients of the material at frequencies of 250, 500, 1000 and 2000 Hz and expressed as the nearest multiple of 0.05.

Table IV therefore shows the results obtained according to this standard:

TABLE IV

NRC and SAA values

|  | Configuration 1 | Configuration 2 | Configuration 3 |
|---|---|---|---|
| NRC | 1.15 | 0.85 | 0.95 |
| SAA | 1.16 | 0.87 | 0.96 |

The following conclusions can therefore be made based on this data. The curtain placed 5 cm from the wall (configuration 2) can absorb 65% (0.65) of the sound according to the European criterion or 85% (0.85) according to the American criterion. By separating it 20 cm from the wall (configuration 3), the same curtain absorbs 100% of the sound according to the European criterion or 95% according to the American criterion. In this case, the curtain has the maximum acoustic rating of "A". If two curtains are used (configuration 1), maximum absorption in both criteria is assured and the maximum rating of "A" is exceeded.

Therefore, a single curtain according to the present invention placed at 20 cm assures virtually complete sound absorption, whereas the combined use of two curtains assures complete sound absorption.

General Sound Insulation Tests:

Sound insulation tests were performed in a sound transmission chamber according to the ASTM E90-09, UNE-EN ISO 140-3:1995 and UNE-EN ISO 717-1:1997 standards.

The UNE-EN ISO 140-3:1995 standard defines the sound reduction index, R, expressed with one decimal place and in dB, as sound insulation value. This index depends on the area of the sample, the equivalent sound reabsorption area in the receiving room and the isolation between rooms D, according to the following formula:

$$R = D + 10\log\frac{S}{A}$$

On the other hand, weighting "w" is defined in the UNE EN ISO 717-1: 1997 standard.

The ASTM E90-09 standard is in turn based on transmission loss. This parameter is equivalent to the sound reduction index, R, described above and is calculated the same way.

Figure 3:
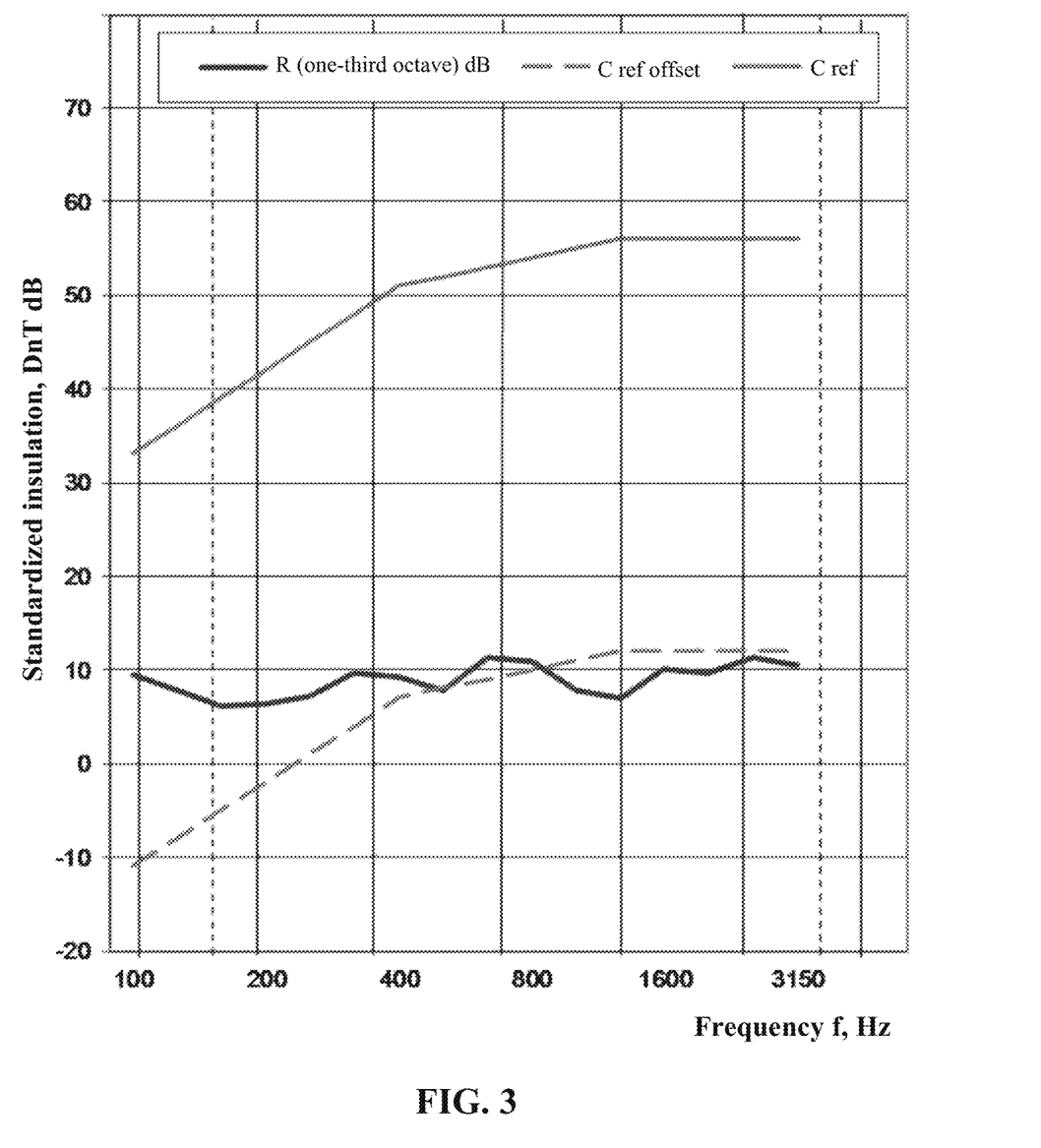
FIG. 3 is a graph showing the standardized airborne sound insulation of a curtain according to the preferred embodiment of the present invention.

According to the test performed using a single curtain according to the present invention as a barrier, an airborne sound insulation $R_w$ of 10 dB, which is equivalent to reducing noise by more than one-eighth, is obtained. These results are shown in the attached FIG. 3.

By way of comparative example, a numerical study was performed for the sound insulation obtained with a curtain formed by the same materials as the curtain according to the present invention, but with the layers arranged in a different order. The curtain of the comparative example had the following layer arrangement:

textile layer+cover layer+inner layer+textile layer

A sound insulation of 8.4 dB (i.e., a reduction in insulation of about 1.5 dB) was obtained with this configuration, which involves a loss of efficacy of about 50%. This test demonstrates the surprising efficacy of a curtain having the specific structure disclosed in the present document compared to curtains comprising the same layers arranged in a different order.

In Situ Sound Insulation Tests:

Tests were performed according to the UNE-EN ISO 140-4:1999, UNE-EN ISO 140-14:2005 and UNE-EN ISO 3382-2:2008 standards to evaluate in situ sound insulation and noise reduction of the curtain according to the present invention.

The purpose of these tests is to assess the sound insulation that the curtain may offer as an element for separating different environments, as well as its effect as a sound conditioner. Two configurations were used to that end:

Configuration 1: A curtain according to the present invention used as a separation.

Configuration 2: Two curtains according to the present invention used as a separation, located 20 cm from one another.

The following equipment was used in these tests:

Type 2250 Bruel & Kjær sound level meter analyzer. SN: 2506776

Type 4189 Bruel & Kjær ½" condenser microphone. SN: 2534152

Type 2250 Bruel & Kjær sound level meter analyzer. SN: 2506479

Type 4189 Bruel & Kjær ½" condenser microphone. SN: 2523647

Type 4231 Bruel & Kjær type 1 sound calibrator. SN: 2528304

Type 4292 Bruel & Kjær omnidirectional noise source. SN: 018008

Type 2716 Bruel & Kjær power amplifier. SN: 2604370

The calibration of the equipment was confirmed before and after each series of measurements.

Figure 4:
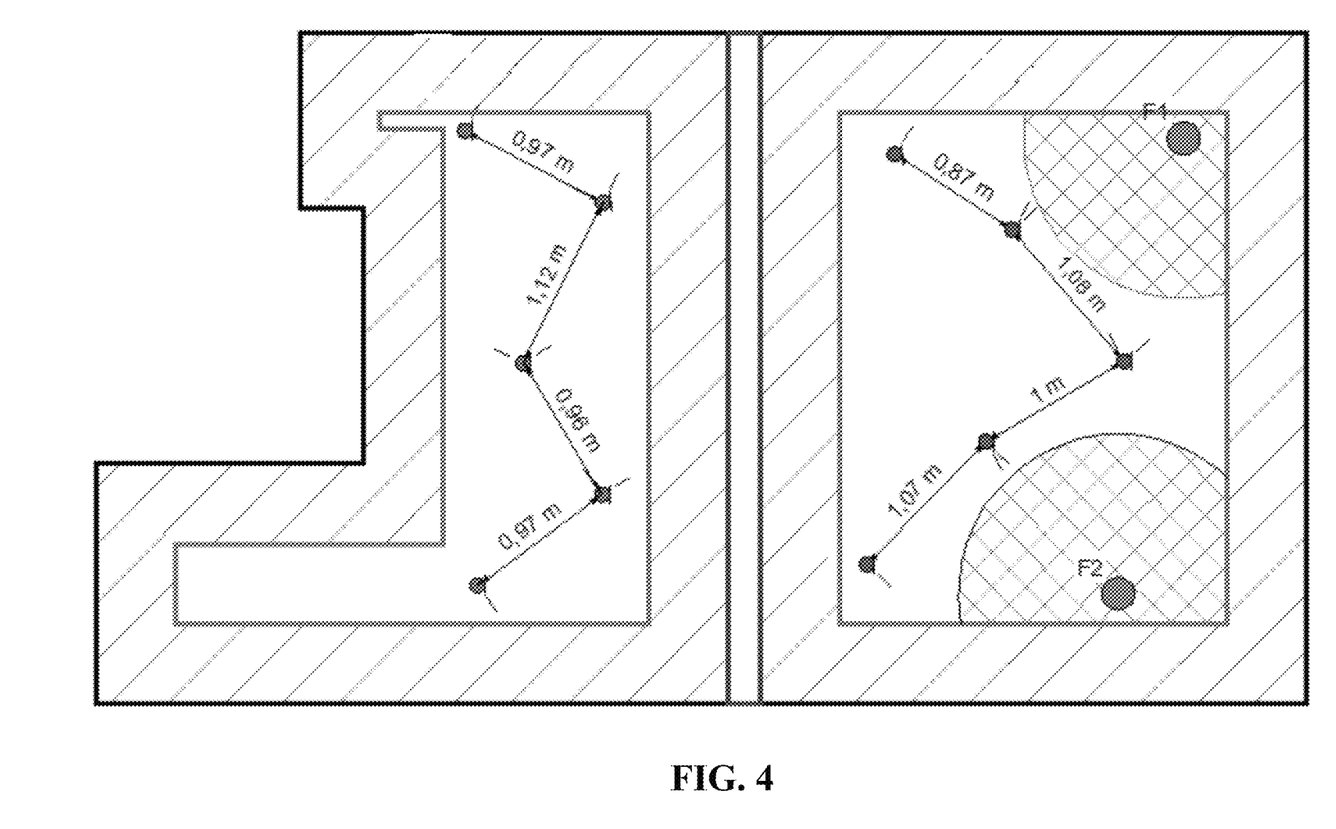
FIG. 4 is a diagram showing the configuration of an in situ noise test for a curtain according to the preferred embodiment of the present invention.

The attached FIG. 4 schematically shows the configuration used in these tests. The emitting room (on the right side of the drawing) had a volume of 34.7 m³, whereas the receiving room (on the left side of the drawing) had a volume of 30.3 m³. The curtain according to the present invention was located separating both rooms (white area in the center of the drawing). It can be seen in FIG. 4 that the microphones were all located more than 0.7 m from one another, and more than 0.5 m from the edges of the room and more than 1 m from the sound sources. Furthermore, the sound sources (F1 and F2) are located more than 0.7 m from one another, as well as more than 0.5 m from the edges of the room. The areas marked with a grid in FIG. 4 represent the perimeter at 1 m from each of the sources, in which no microphone can be placed. The areas marked with stripes represent the perimeter at 0.5 m from the walls, in which neither microphone nor sound source can be placed.

According to the UNE EN ISO 140-4:1999 standard, the value of the normalized level difference, $D_n$, the standardized level difference, $D_{nT}$, or the apparent sound reduction index, R', must be provided. The values of the weighted standardized level difference, $D_{nTA}$, and the weighted apparent sound reduction index, $R'_A$ (the weighted values are obtained according to the UNE EN ISO 171-1 standard), will be presented in this case.

Figure 5A:
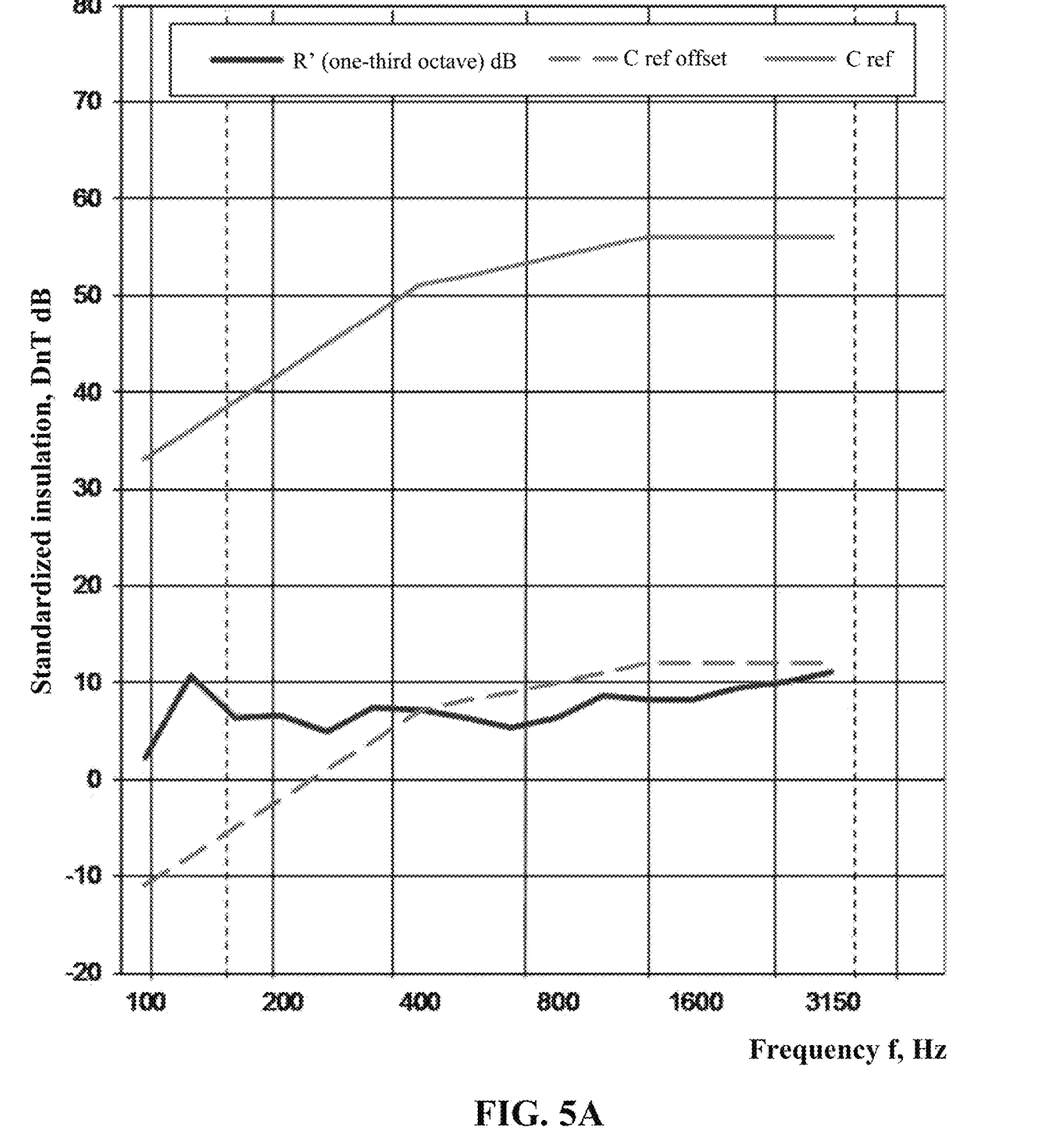
FIGS. 5A and 5B are graphs showing the in situ standardized sound insulation of a curtain (FIG. 5A) and two curtains (FIG. 5B) according to the preferred embodiment of the present invention using the configuration shown in FIG. 4.
Figure 5B:
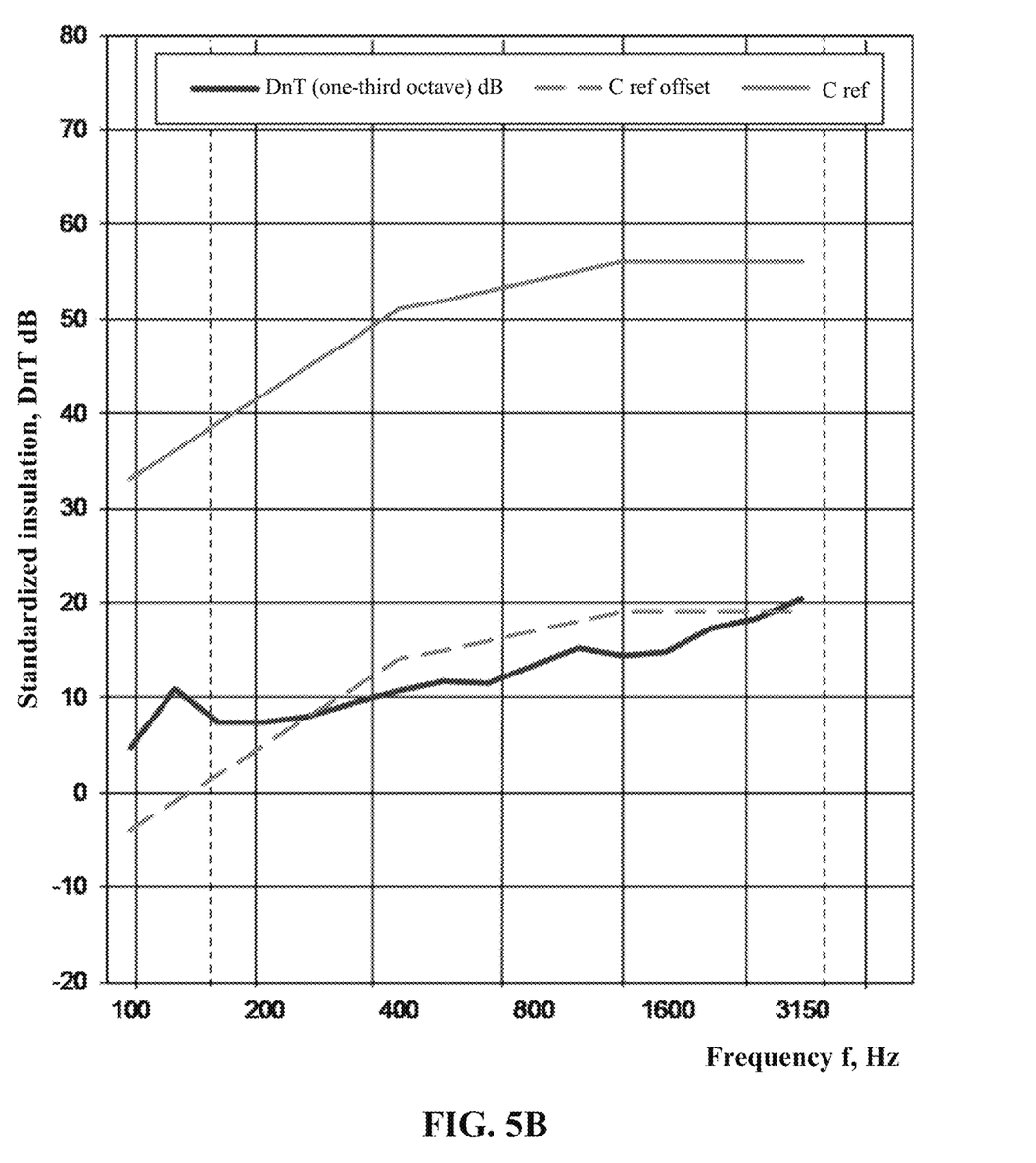

FIGS. 5A (configuration 1) and 5B (configuration 2), as well as Table V below summarize the results obtained in these tests:

TABLE V

| $D_{nTA}$ and $R'_A$ | | |
| --- | --- | --- |
| | $D_{nTA}$ | $R'_A$ |
| Configuration 1 | 8 dB | 9 dB |
| Configuration 2 | 15 dB | 15 dB |

It can therefore be observed that a sound insulation of 9 dBA (configuration 1) and 15 dBA (configuration 2), which assures good sound insulation (a ⅛ reduction of noise level in configuration 1 and a 1/32 reduction in configuration 2), is obtained. Placing the curtains according to the present invention as separating elements therefore offers good sound insulation data. It must be taken into account that the installation of the curtain in the test that has been performed did not guaranteed sound leakages through the sides, so the results could be further improved if care is taken to close the perimeter of the curtains with suitable assemblies.

It is also important to take into account the effect the curtain produces in the room. The reverberation time in the room without a curtain and with curtains according to the present invention in the two configurations described above, in both the emitting and receiving room, was tested.

Figure 6:
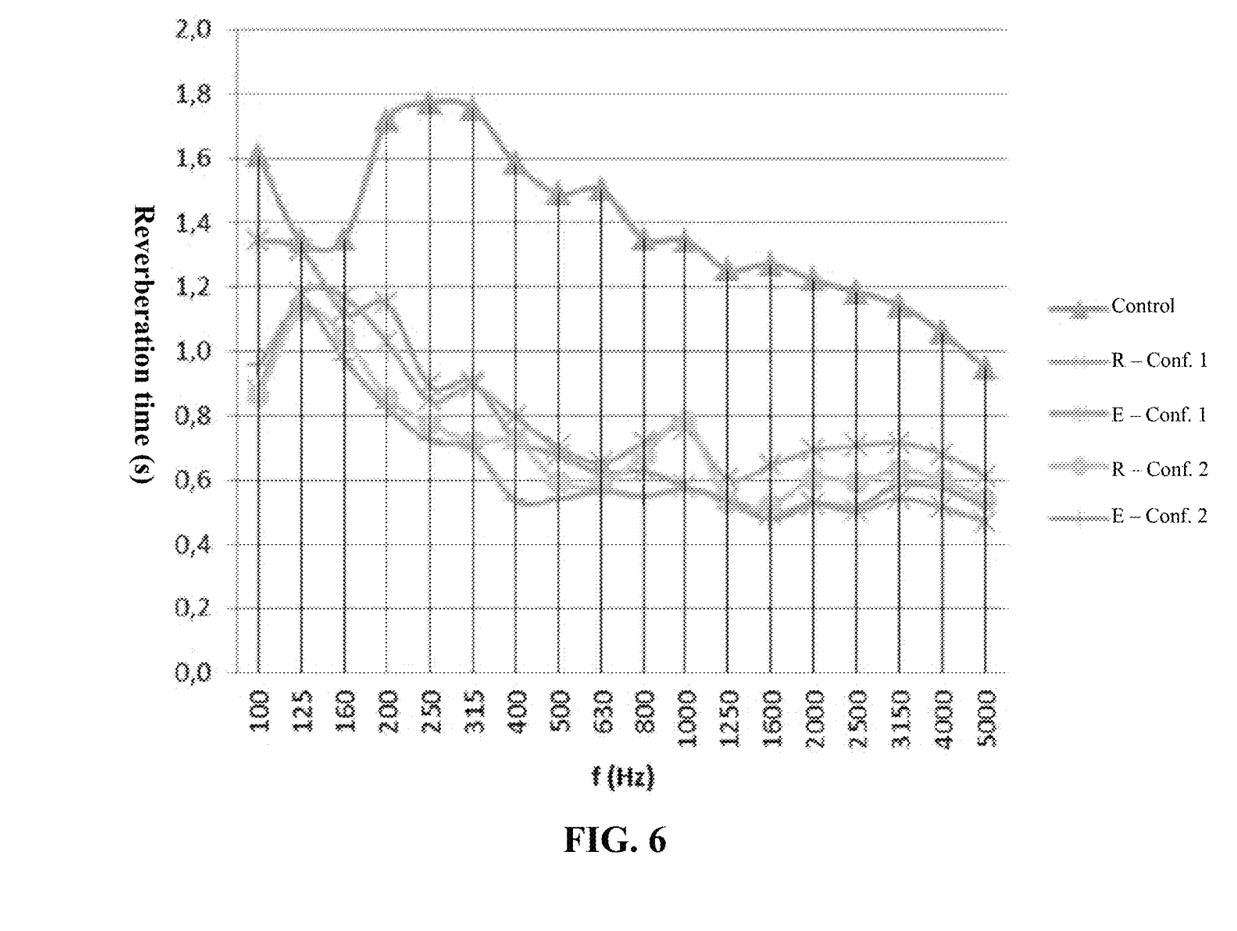
FIG. 6 is a graph showing the reverberation time obtained in a room without a curtain and with curtains according to the preferred embodiment of the present invention.

FIG. 6 shows the results of the reverberation time under various conditions (the control represents the test without using a separating curtain, R represents the measurements obtained in the receiving room and E represents the measurements obtained in the emitting room). It can be seen that placing the curtain according to the present invention considerably reduces the "echo" of the room, the annoying "echo" now being at values that are suitable for an office, for example. When analyzing the mean reverberation time, it goes from 1.4 s without a curtain to 0.5-0.7 s with a curtain, which is a value that is very suitable for use.

Figure 7:
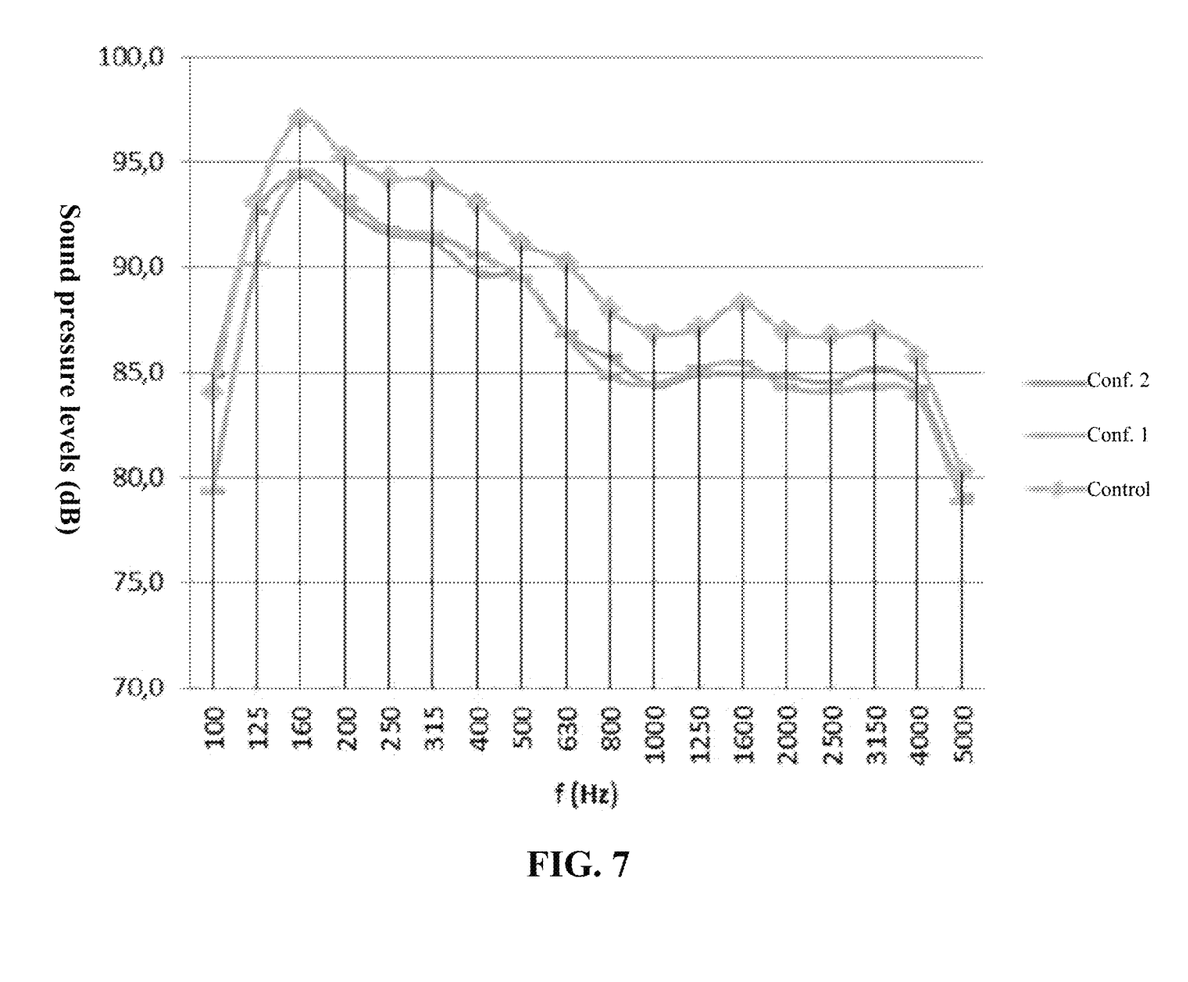
FIG. 7 is a graph showing the sound pressure level obtained in a room without a curtain and with curtains according to the preferred embodiment of the present invention.

Finally, the sound pressure level in the emitting room was tested, both without a curtain and with the curtain according to the present invention in the two configurations described above. The attached FIG. 7 shows the results (the control represents the test without using a separating curtain).

It can be seen that placing the curtain according to the present invention reduces the noise level with respect to a fixed reference source. In fact, a weighted noise level reduction of 3 dB is produced, which is equivalent to reducing the noise by half.

Protection Against Electromagnetic Radiations

Electromagnetic tests were performed in an anechoic electromagnetic chamber. The references of the antennas used in the test are the following: Double Ridged Waveguide Horn—model DRH400 and Quad Ridged Horn Antenna—model QRH500.

Reflection and transmission tests were performed. The tested bandwidth covered from 400 MHz to 6 GHz (mobile telephony, Wi-Fi, WiMax and other bandwidths of interest) to assess the effectiveness thereof in a wide range.

Two configurations were tested: a configuration with a single curtain (configuration 1) and a configuration with two curtains (configuration 2). A test measurement was also performed without using any curtain (control).

In the reflection test, high attenuation can be observed in both configurations (results not shown).

Figure 8:
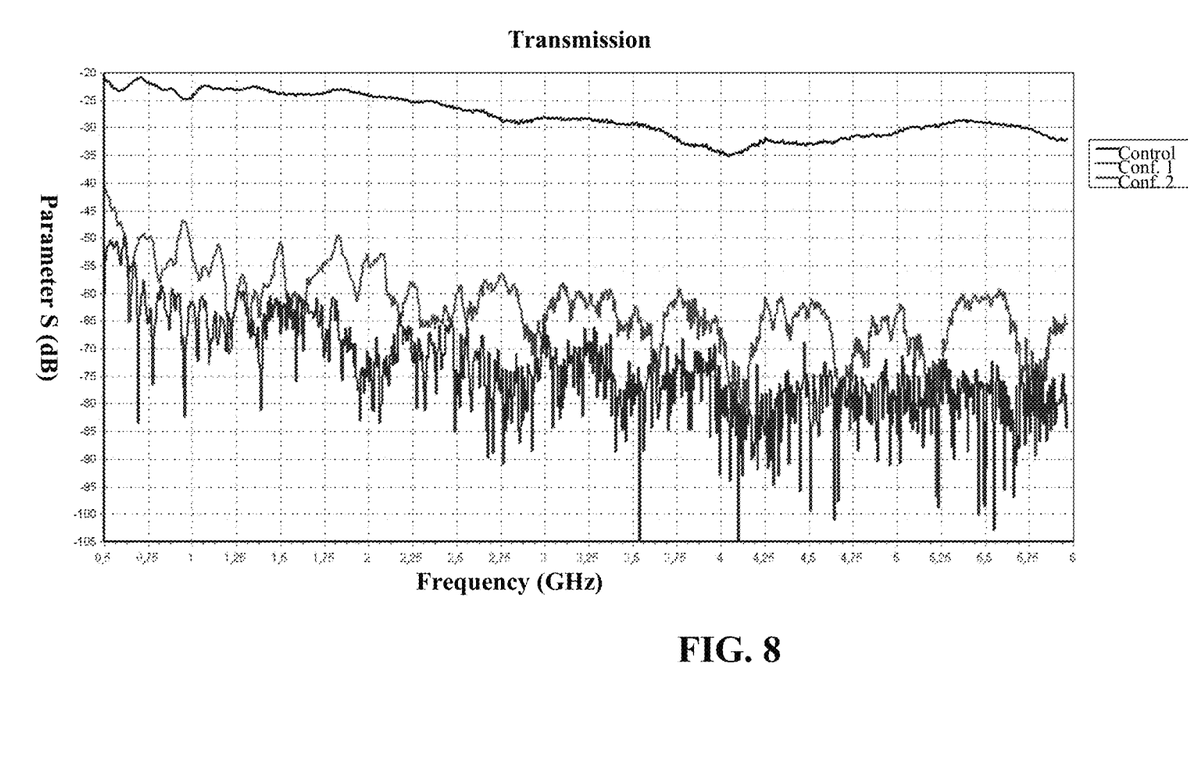
FIG. 8 is a graph showing the electromagnetic insulation obtained with a curtain according to the preferred embodiment of the present invention.

The attached FIG. 8 shows the results of the transmission test. Very high attenuation, exceeding 50 dB even in the configuration with a single curtain, can be seen. It must be taken into account that for designing an electromagnetic chamber the mean attenuation of the wedges is about 40 dB, which means that these curtains according to the present invention can be used as mobile electromagnetic chambers.

It can therefore be seen that the curtain according to the present invention does not shield a specific band, such as certain electronic or mobile telephony noise, but rather has a very wide shielding spectrum (from 400 MHz to 6 GHz), thereby neutralizing the electromagnetic waves of not only mobile telephony signals, but also Wi-Fi signals, WiMax signals and other signals of interest. This, along with how easy it is to transport and install/uninstall as mentioned above, allow applying the curtain according to the present invention to obtain an anechoic electromagnetic chamber or a radiofrequency chamber that is mobile, portable, lightweight and very low-cost.

An anechoic radiofrequency chamber is a room with a metal shielding in its walls, emulating a Faraday cage. The chambers are designed with materials for absorbing electromagnetic waves for the purpose of insulating the chamber against any type of external influence and simulating free space conditions therein. These chambers have a number of applications in the field of telecommunications, such as the measurement of the specific absorption rate (SAR) of mobile terminals, or the design and characterization of radiating elements, such as antenna and dipoles, for example.

Applications of another type for the curtain according to the present invention, as a result of its property of protecting against electromagnetic radiations, can be in medical fields, in which several levels of shielding must be assured for certain equipment or operations. It can also be used for designing cribs for newborns, assuring the best acoustic and thermal conditions for newborns, for example in NICU environments.

Protection Against Fire

According to the UNE-EN 13773:2011 standard, materials are classified with respect to their reaction to fire in classes referred to as M0, M1, M2, M3 and M4. These classes indicate the relative magnitude with which the corresponding materials can favor fire development.

M0: material that is not combustible in response to the normalized thermal action of the test (glass, stone and ceramic materials, metals, gypsums, rock wool, etc.).

M1: material that is combustible but not flammable, which means that combustion does not hold when heat is no longer supplied from an external hot spot (PVC, glass wool, DM, formica, flameproof varnishes, etc.).

M2: material with a low degree of flammability (wood).

M3: material with a medium degree of flammability (wood).

M4: material with a high degree of flammability.

A test was performed to determine the behavior of a curtain according to the present invention in the event of fire, and the curtain was classified as Class 1 (M1) according to said UNE-EN 13773:2011 standard.

On the other hand, a test was performed according to the UNE-EN 13501-1:2007+A1:2010 standard, which classifies materials according to their reaction to fire required by the Technical Building Code (TBC) for public establishments. A classification of Bs1d0 was obtained for the curtain according to the present invention, which assures a very limited contribution to fire (B) with little smoke emission (s1) and without the fire spreading due to burning droplets (d0).

Protection Against Heat

The thermal insulation of a curtain according to the present invention was tested according to the UNE-EN ISO 8894-1:2010 standard.

A 1-cm thick curtain was used in the test and a thermal resistance of 0.13 $m^2K/W$ was obtained.

According to the Technical Building Code, a material is considered a "thermal insulation material" if it has a thermal resistance greater than 0.25 $m^2K/W$. Therefore, the curtain according to the present invention has a value very close to that for being considered a "thermal insulation material".

Given that protection against heat is an additive property, a curtain according to another embodiment of the present invention having a thickness of 2 cm (or the use of two curtains according to the present invention, each having a thickness of 1 cm), has a thermal resistance of 0.26 $m^2K/W$.

The invention claimed is:

1. A curtain providing a barrier against light, noise, heat, fire and electromagnetic radiations, comprising:
    two textile layers each having a combination of non-woven textile material and woven textile material, subjected to a fire-proofing treatment;
    an inner layer sandwiched between the textile layers, formed by sound insulation wool; and
    a cover layer adjacent to the outer side of one of the textile layers, formed by a metal selected from the group consisting of aluminum and copper; where the curtain has a total thickness between 0.5 cm and 3 cm.

2. The curtain according to claim 1, characterized in that the curtain has a total thickness of 1 cm.

3. The curtain according to claim 1, characterized in that the curtain has a total weight of 1 $kg/m^2$.

4. The curtain according to claim 1, characterized in that the non-woven textile material is felt.

5. The curtain according to claim 4, characterized in that the thickness of the felt is from 3 mm to 20 mm.

6. The curtain according to claim 4, characterized in that the felt has a density of 15 $kg/m^3$ to 40 $kg/m^3$.

7. The curtain according to claim 1, characterized in that the woven textile material has a density of 100 $g/m^2$ to 300 g/m2.

8. The curtain according to claim 1, characterized in that the fire-proofing treatment is performed by means of covering the textile layer with a material selected from polyvinyl chloride, tetrakis(hydroxymethyl)phosphonium salt, diammonium phosphate/ammonium sulfate/boron compound, hexapropoxyphosphazene, oligomeric phosphate and thiourea/titanium and zirconium compound/dibromoterephthalic acid.

9. The curtain according to claim 1, characterized in that the textile layer furthermore is subjected to at least one treatment selected from a water-proofing treatment and an oil-proofing treatment.

10. The curtain according to claim 1, characterized in that the textile layer is made of fibers selected from the group consisting of cotton, linen, polypropylene, polyester, jute, polyamide, rayon, nylon, PVC and combinations thereof.

11. The curtain according to claim 1, characterized in that the inner layer (12) is formed by polyester wool.

12. The curtain according to claim 1, characterized in that the inner layer (12) is formed by wool comprising at least 80% of a compound selected from the group comprising PP, PES and PET.

13. The curtain according to claim 1, characterized in that the inner layer has a thickness between 3 mm and 1 cm.

14. The curtain according to claim 1, characterized in that the inner layer has a density between 10 $kg/m^3$ and 50 $kg/m^3$.

15. The curtain according to claim 1, characterized in that the cover layer has a thickness between 0.5 mm and 5 mm.

16. The curtain according to claim 1 characterized in that the inner cover layer furthermore has a glass fiber mesh reinforcement.

17. The curtain according to claim 1, characterized in that it comprises a second inner layer, identical to the inner layer, sandwiched between the textile layer and the cover layer adjacent thereto.

* * * * *